United States Patent
Boatright et al.

(10) Patent No.: US 8,990,872 B2
(45) Date of Patent: *Mar. 24, 2015

(54) SYSTEM AND METHOD FOR USING A SET-TOP BOX APPLICATION TO DIAGNOSE CUSTOMER PREMISES EQUIPMENT

(71) Applicant: AT&T Intellectual Property I, LP, Atlanta, GA (US)

(72) Inventors: Michael Boatright, Decatur, GA (US); Nathan L. Edwards, The Colony, TX (US); Sean T. Hamrick, Dallas, TX (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 93 days.

This patent is subject to a terminal disclaimer.

(21) Appl. No.: 13/767,113

(22) Filed: Feb. 14, 2013

(65) Prior Publication Data

US 2013/0152140 A1 Jun. 13, 2013

Related U.S. Application Data

(63) Continuation of application No. 12/603,646, filed on Oct. 22, 2009, now Pat. No. 8,418,215.

(51) Int. Cl.
| | | |
|---|---|---|
| H04N 7/16 | (2011.01) | |
| H04N 7/173 | (2011.01) | |
| H04N 21/61 | (2011.01) | |
| H04L 12/26 | (2006.01) | |
| H04L 12/24 | (2006.01) | |
| H04N 21/254 | (2011.01) | |
| H04N 21/478 | (2011.01) | |
| H04N 21/81 | (2011.01) | |

(52) U.S. Cl.
CPC ........ *H04N 21/6181* (2013.01); *H04L 12/2697* (2013.01); *H04L 41/5074* (2013.01); *H04L 43/50* (2013.01); *H04N 21/254* (2013.01); *H04N 21/478* (2013.01); *H04N 21/8193* (2013.01)
USPC ............... 725/107; 725/14; 725/62; 725/114; 725/131; 725/151

(58) Field of Classification Search
USPC .............. 725/14, 62, 107, 114, 131, 144, 151
See application file for complete search history.

(56) References Cited

U.S. PATENT DOCUMENTS

| | | | |
|---|---|---|---|
| 6,445,907 B1 | 9/2002 | Middeke et al. | |
| 6,754,908 B1 | 6/2004 | Medvinsky | |
| 7,826,383 B2 | 11/2010 | Savard et al. | |
| 8,004,962 B2 | 8/2011 | Yang et al. | |
| 8,418,215 B2* | 4/2013 | Boatright et al. | ............. 725/107 |
| 2002/0141348 A1 | 10/2002 | Swix et al. | |
| 2009/0175180 A1 | 7/2009 | Yang et al. | |

* cited by examiner

*Primary Examiner* — Kieu Oanh T Bui
(74) *Attorney, Agent, or Firm* — Guntin & Gust, PLC; Joseph P. Hrutka

(57) ABSTRACT

A device having a test module configured to connect with a server through a cellular telephone network and a wireless area network. The test module is also configured to initiate, in the server, a diagnostic test of an Internet Protocol television network and a set-top box device. The test module is further configured to receive information indicating problems with the Internet Protocol television network and the set-top box device, and to display the information on a display.

20 Claims, 3 Drawing Sheets

SYSTEM AND METHOD FOR USING A SET-TOP BOX APPLICATION TO DIAGNOSE CUSTOMER PREMISES EQUIPMENT

CROSS-REFERENCE TO RELATED APPLICATIONS

This application is a continuation of U.S. patent application Ser. No. 12/603,646 filed Oct. 22, 2009, which is incorporated herein by reference in its entirety.

FIELD OF THE DISCLOSURE

The present disclosure generally relates to communications networks, and more particularly relates to a system and a method for using a set-top box application to diagnose customer premises equipment.

BACKGROUND OF THE DISCLOSURE

An Internet Protocol television (IPTV) service provider can transmit an IPTV signal to a user via a central office, a serving area interface, and a residential gateway. The IPTV service provider can offer the user a variety of different television programs and/or movies. For example, the IPTV service provider can supply users with real-time television programs that are typically available for the users to watch only at a specific date and time. The IPTV service provider can also offer the users on-demand movies that are available for an extended amount of time and that are provided to the users upon request of the on-demand movie.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF THE DRAWINGS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Figure 1:
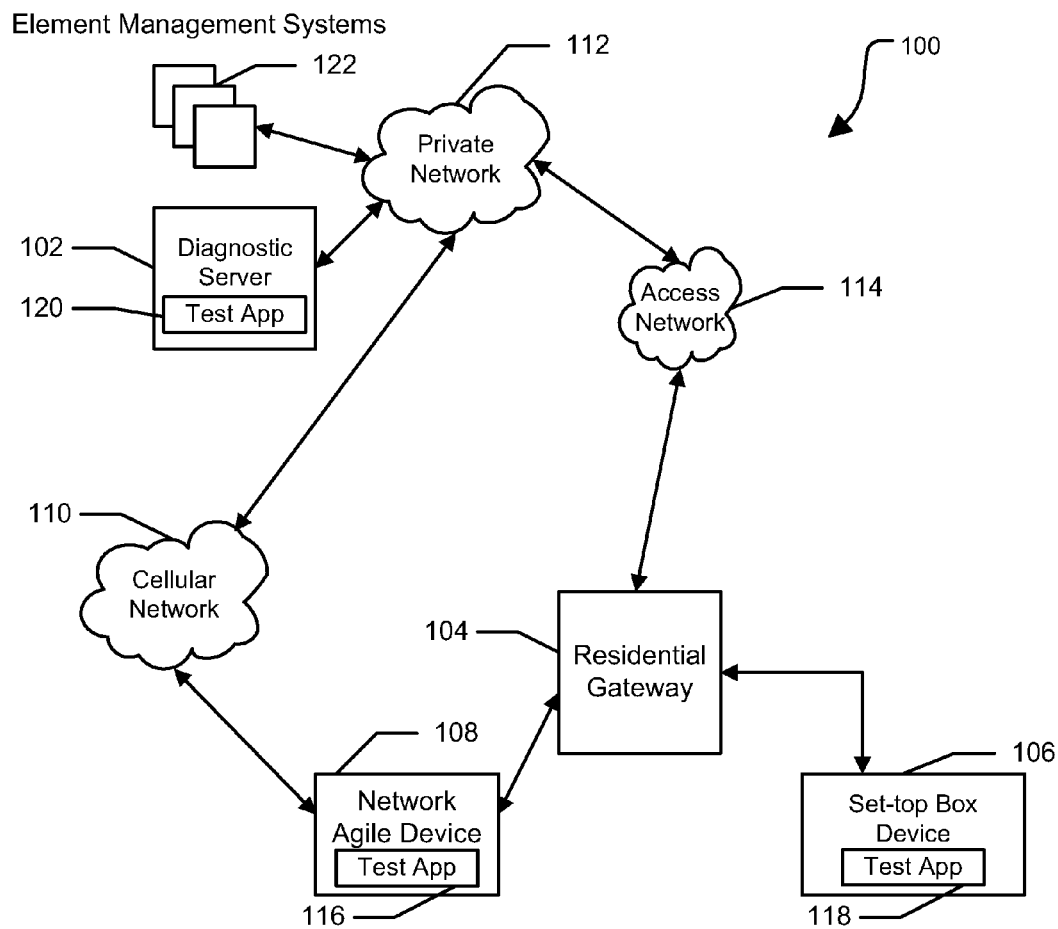
FIG. 1 of an Internet Protocol television system.

FIG. 1 shows an Internet Protocol television (IPTV) system 100 including a diagnostic server 102, a residential gateway 104, a set-top box device 106, a network agile device 108, a cellular network 110, a private network 112, an access network 114, and element management systems 116. The diagnostic server 102 is in communication with the residential gateway 104, the set-top box device 106, and the network agile device 108 via the private network 112 and the access network 114. The diagnostic server 102 also can communicate with the network agile device 108 via the private network 112 and the cellular network 110. The diagnostic server 102 is in communication with the element management systems 116 via the private network 112.

The set-top box device 106 is in communication with the residential gateway 104, such as through a wired or wireless connection. The network agile device 108 is in communication with the residential gateway 104 via a wireless connection, such as an 802.11(g) connection or any other wireless connection protocol. The network agile device 108 is in communication with the cellular network 110, such as through a 3G cellular connection. The network agile device 108 can be any device that is capable of communicating over a wireless network connection, and over the cellular telephone network 110, such as a cellular telephone, a personal digital assistant, a laptop computer, and the like.

The set-top box device 106 can receive and display IPTV signals from the IPTV network 100 through the private network 112 and the access network 114. However, the user may encounter problems with the ability of the set-top box device 106 to receive and/or display the IPTV signals, or problems with the ability of the residential gateway 104 to receive other IP signals from the network. The problem can be a loss of video or audio in an IPTV video stream, loss of an application such as the electronic programming guide, loss of voice over Internet Protocol (VoIP), and the like. In this situation, the user can either call customer service or initiate a test application or module 118 or 120 to cause a network diagnostic application 122 to diagnose the problem. The test modules 118 and 120 can be hardware, software, and/or any combination of hardware and software. The test application 118 can be implemented on the network agile device 108, and the test application 120 can be implemented on the set-top box device 106.

The test application 120 within the set-top box device 106 can be executed in response to a command received from the user, such as the user pressing a test button (not shown) on the set-top box device or on the remote control device (not shown). The test application 120 can then attempt to connect with the network diagnostic application 122 of the diagnostic server 102 via the residential gateway 104, the access network 114, and the private network 112, and utilize this connection to allow the set-top box device 106 to communicate with the diagnostic server 102.

When the test application 118 on the network agile device 108 is activated, the test application initializes and attempts to connect to a network diagnostic application 122 residing in the diagnostic server 102. The test application 118 can first attempt to connect with the diagnostic server 102 via the residential gateway 104, the access network 114, and the private network 112. However, if the wireless network connection between the network agile device 108 and the residential gateway 104 is down or the residential gateway cannot connect with the diagnostic server 102, the network agile device can attempt to connect with the diagnostic server via the cellular network 110. The test application 118 can determine that the connection with the residential gateway 104 is down based on the test application not receiving a reply from the residential gateway for a specific number of times. The test application 118 can then utilize the cellular network 110 to continue to communicate with the network diagnostic application 122.

The user can interact with the network diagnostic application 122 via the test application 118 or 120 to diagnose and resolve problems with the set-top box device 106 and/or the residential gateway 104, identify and inform the user of broader network outages affecting the user, collect diagnostic information associated with the set-top box device, automatically dispatch repair tickets, and the like. An initial diagnostic step of the network diagnostic application 122 can be to determine whether the diagnostic server 102 is properly communicating with the set-top box device 106 via a preferred connection. For example, the diagnostic server 102 can first attempt to communicate with the element management systems 122 throughout the private network 112 to verify that the private network is working. The network diagnostic application 120 can then check the access network 114 to verify that the diagnostic server 102 can properly communicate with the residential gateway 104 and the set-top box device 106.

If the connection is operative, the diagnostic session can proceed as discussed below. However, if the connection is not operative, the diagnostic server 102 can attempt to diagnose and correct any problems in the residential gateway 104 and/or the set-top box device 106 through the cellular network 110 and the network agile device 108. For example, the diagnostic server 102 may attempt to update the operating system of the set-top box device 106 and/or update a driver of the residential gateway 102 by sending a command to the set-top box device via the cellular network 110 and the network agile device 108. If the network diagnostic application 122 receives information that the updates cannot be performed, the diagnostic server 102 may initiate the arrangement of an on-site technician service call.

During the diagnostic session, the network diagnostic application 122 can interact with the user via the test application 118 or 120, which in turn can interact with the user to attempt to diagnose the problems based on rules within the network diagnostic application, such as taking recommended actions. The recommended action can include rebooting the set-top box device 106, rebooting the residential gateway 104, and the like. Additionally, the network diagnostic application 122 can trace the entire customer access network path from the private network 112 through the element management systems 122, to the access network 114, to the residential gateway 104, and to the set-top box device 106. The network diagnostic application 122 can then provide the test application 118 or 120 with network outage situations, other network problems, the amount of time until the problem is repaired, and the like. Then the test application 118 can display the information on a display device associated with the network agile device 108 Similarly, the test application 120 can display the information on a display device associated with the set-top box device 106.

The set-top box device 106 can receive a query or command from the diagnostic server 102, and based on the query or command the set-top box device can perform various system diagnoses to evaluate the performance of the set-top box device. The set-top box device 106 may then return diagnostic data to the diagnostic server 102 identifying the problem or indicating a failure to identify the problem via the access network 114, or the network agile device 108 and the cellular network 110. The diagnostic server 102 can then return a query for more information or a command to perform a remedial function, such as downloading a software update from the IPTV network 100 or changing one or more operation parameters of the set-top box device 106. The set-top box device 106 also can perform diagnostic functions on the residential gateway 104 or any other device attached to the set-top box device. If the problem cannot be corrected, the set-top box device 106 can be instructed to enter the identification of the set-top box device in a service log for an on-site technical service call.

Figure 2:
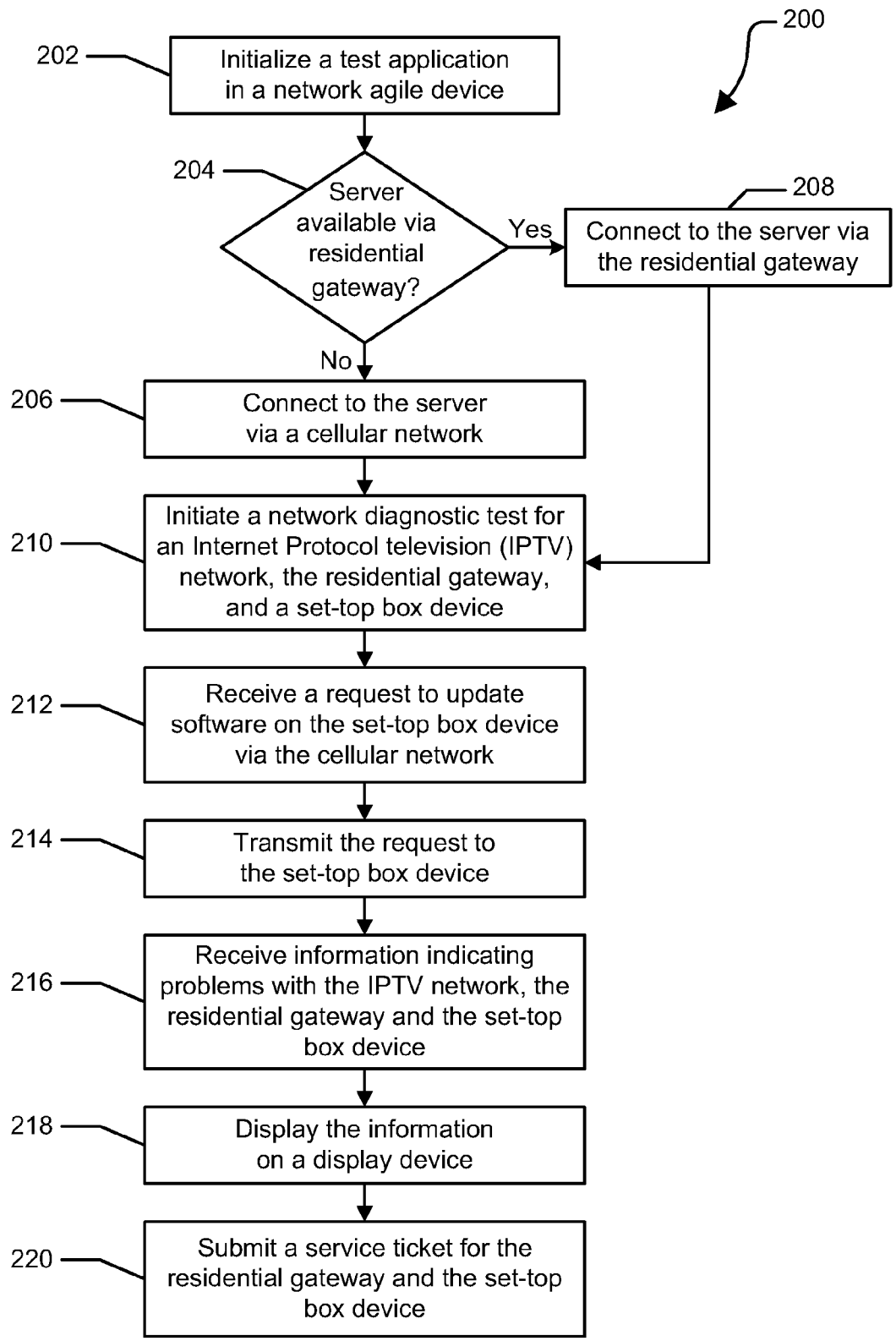
FIG. 2 is a flow diagram of a method for initiating a diagnostic test for a set-top box device in the IPTV system.

FIG. 2 shows a flow diagram of a method 200 for diagnosing an IPTV network problem via a network agile device. At block 202, a test application is initialized in a network agile device. A determination is made whether a server is available via a residential gateway at block 204. The server can be a diagnostic server located in the IPTV network. If the server is not available via the residential gateway, the server is connected to via a cellular network at block 206. However, if the server is available via the residential gateway, the network agile device is connected to the server via the residential gateway at block 208. At block 210, a network diagnostic test is initiated for the IPTV network, the residential gateway, and a set-top box device.

A request to update software on the set-top box device is receive via the cellular network at block 212. The request can be received by the network agile device. A block 214, the request is transmitted to the set-top box device. The network agile device can transmit the request to the set-top box device via a wireless connection with the residential gateway connected to the set-top box device. Information indicating problems with the IPTV network, the residential gateway, and the set-top box device is received at block 216. At block 218 the information is displayed on a display device associated with the network agile device. A service ticket is submitted for the residential gateway and the set-top box device at block 220.

Figure 3:
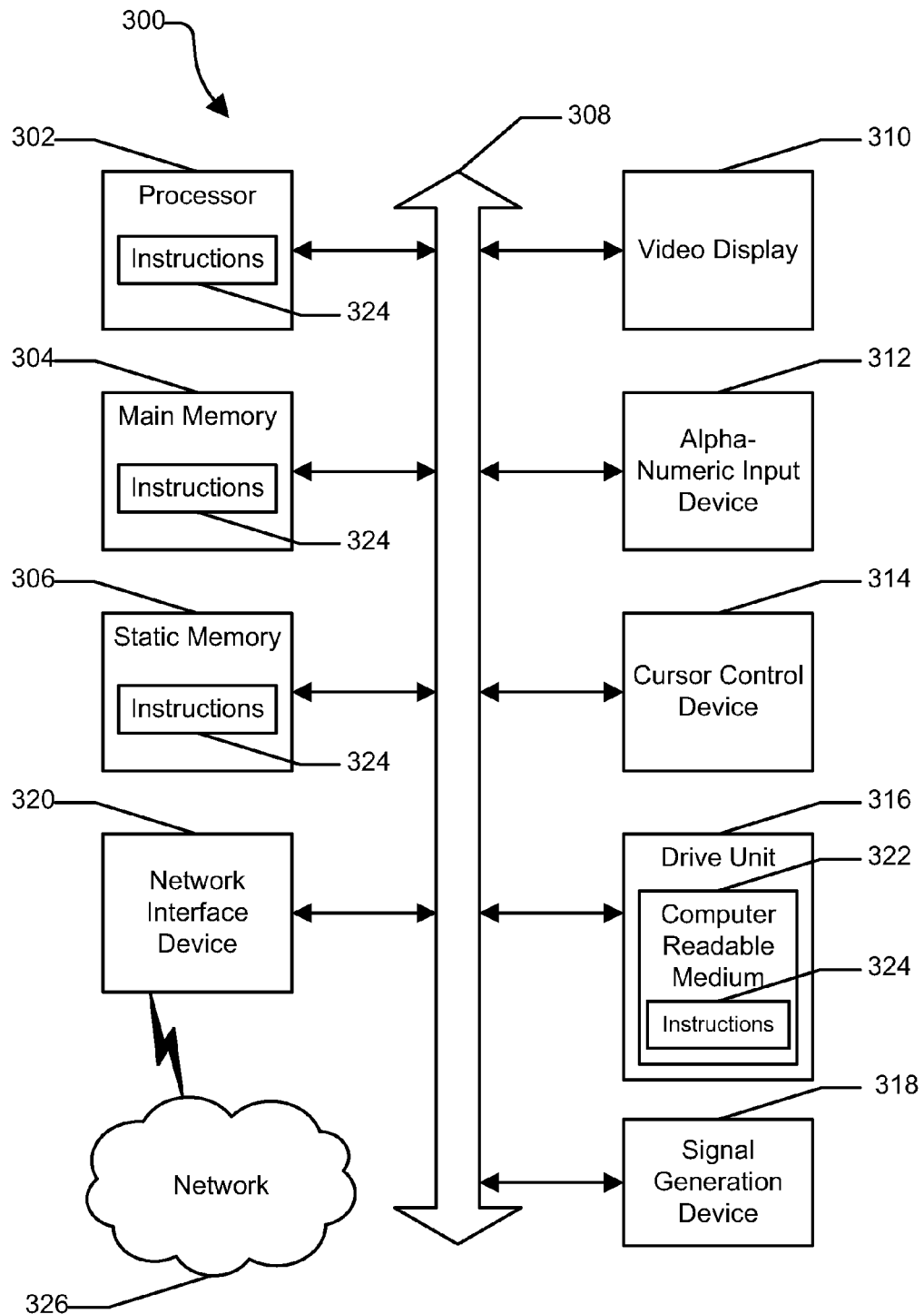
FIG. 3 is an illustrative embodiment of a general computer system.

FIG. 3 shows an illustrative embodiment of a general computer system 300. The computer system 300 can include a set of instructions that can be executed to cause the computer system to perform any one or more of the methods or computer based functions disclosed herein. The computer system 300 may operate as a standalone device or may be connected, such as by using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 300 can also be implemented as or incorporated into various devices, such as a personal computer (PC), a tablet PC, an STB, a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 300 can be implemented using electronic devices that provide voice, video or data communication. Further, while a single computer system 300 is illustrated, the term "system" shall also be taken to include any collection of systems or sub-systems that individually or jointly execute a set, or multiple sets, of instructions to perform one or more computer functions.

The computer system 300 may include a processor 302, such as a central processing unit (CPU), a graphics processing unit (GPU), or both. Moreover, the computer system 300 can include a main memory 304 and a static memory 306 that can communicate with each other via a bus 308. As shown, the computer system 300 may further include a video display unit 310 such as a liquid crystal display (LCD), an organic light emitting diode (OLED), a flat panel display, a solid state display, or a cathode ray tube (CRT). Additionally, the computer system 300 may include an input device 312 such as a keyboard, and a cursor control device 314 such as a mouse. The computer system 300 can also include a disk drive unit 316, a signal generation device 318 such as a speaker or remote control, and a network interface device 320 to communicate with a network 326. In a particular embodiment, the disk drive unit 316 may include a computer-readable medium 322 in which one or more sets of instructions 324, such as software, can be embedded. Further, the instructions 324 may embody one or more of the methods or logic as described herein. In a particular embodiment, the instructions 324 may reside completely, or at least partially, within the main memory 304, the static memory 306, and/or within the processor 302 during execution by the computer system 300. The main memory 304 and the processor 302 also may include computer-readable media.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized Accordingly, the disclosure and the FIGs. are to be regarded as illustrative rather than restrictive.

The Abstract of the Disclosure is provided to comply with 37 C.F.R. §1.72(b) and is submitted with the understanding that it will not be used to interpret or limit the scope or meaning of the claims. In addition, in the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description of the Drawings, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosed subject matter. Thus, to the maximum extent allowed by law, the scope of the present disclosed subject matter is to be determined by the broadest permissible interpretation of the following claims and their equivalents, and shall not be restricted or limited by the foregoing detailed description.

What is claimed is:

1. A gateway device, comprising:
   a memory that stores instructions; and
   a processor coupled to the memory, wherein the processor, responsive to executing the instructions, performs operations comprising:
      facilitating establishment of a first communication link between a set-top box device and a server device through a first network;
      receiving an indication that the set-top box device and the server device are not communicating through the first communication link;
      facilitating establishment of a second communication link with a network agile device responsive to receiving the indication that the set-top box device and the server device are not communicating through the first communication link; and
      routing diagnostic communications between a diagnostic server device and the set-top box device through the second communication link, wherein the diagnostic server device is coupled to the network agile device via a cellular network.

2. The gateway device of claim 1, wherein the first communication link comprises a wireless network connection.

3. The gateway device of claim 2, wherein the operations further comprise determining that the wireless network connection is not accessible.

4. The gateway device of claim 1, wherein the network agile device presents test information associated with the server device and the set-top box device.

5. The gateway device of claim 1, wherein the network agile device initiates a service ticket at the diagnostic server device.

6. The gateway device of claim 1, wherein the operations further comprise routing a software update request from the diagnostic server device to the set-top box device through the cellular network.

7. The gateway device of claim 1, wherein the network agile device comprises a cellular telephone device.

8. The gateway device of claim 1, wherein the indication is received from the set-Top box device.

9. The gateway device of claim 1, wherein the indication is received from the diagnostic server device.

10. A method, comprising:
    determining, by a system comprising a processor, whether a server device and a set-top box device are communicating through a first communication link;
    facilitating establishment of a second communication link with a network agile device by way of a cellular network responsive to determining that the server device and the set-top box device are not communicating through the first communication link, wherein the network agile device is further operable to access the set-top box device; and
    routing, by the system, diagnostic communications to the set-top box device through the second communication link.

11. The method of claim 10, further comprising:
    transmitting, by the system, a request to update software to the set-top box device via the second communication link; and
    transmitting, by the system, the software for updating responsive to an acceptance of the request.

12. The method of claim 10, further comprising performing, by the system, a network diagnostics test that is initiated by one of a cellular telephone, a personal digital assistant, and a laptop computer.

13. The method of claim 10, further comprising creating, by the system, a service ticket for the set-top box device responsive to determining that the server device and the set-top box device are not communicating through the first communication link.

14. The method of claim 10, wherein the network agile device comprises a cellular telephone device.

15. The method of claim 10, further comprising receiving an indication that the set-top box device and the server device are not communicating through the first communication link.

16. A server device, comprising:
   a memory that stores instructions; and
   a processor coupled to the memory, wherein the processor, responsive to executing the instructions, performs operations comprising:
      facilitating establishment of a first communication link with a set-top box device through a gateway device;
      identifying a problem with the first communication link to the set-top box device; and
      facilitating establishment of a second communication link with the set-top box by way of a network agile device a cellular network responsive to the problem that is identified.

17. The server device of claim 16, wherein the network agile device comprises a cellular telephone device.

18. The server device of claim 16, wherein the operations further comprise receiving an indication from the set-top box device of the problem with the first communication link.

19. The server device of claim 16, wherein the operations further comprise receiving an indication from a diagnostic server device of the problem with the first communication link.

20. The server device of claim 16, wherein the operations further comprise performing a diagnostic test on the first communication link.

* * * * *